United States Patent

Rongo et al.

[11] Patent Number: 5,917,600
[45] Date of Patent: Jun. 29, 1999

[54] DISPLACEMENT SENSOR

[75] Inventors: Robert Rongo, Danville; Jerry J. Song, Indianapolis, both of Ind.

[73] Assignee: Cybo Robots, Inc, Indianapolis, Ind.

[21] Appl. No.: 08/878,252

[22] Filed: Jun. 18, 1997

[51] Int. Cl.[6] .................................................. G01B 11/14
[52] U.S. Cl. ............................................................. 356/375
[58] Field of Search .................................... 356/375, 3.09

[56] References Cited

U.S. PATENT DOCUMENTS

| | | | |
|---|---|---|---|
| 4,705,395 | 11/1987 | Hageniers | 356/1 |
| 4,725,146 | 2/1988 | Hutchin | 356/375 |
| 4,884,889 | 12/1989 | Beckwith, Jr. | 356/375 |
| 4,900,146 | 2/1990 | Penney et al. | 356/1 |
| 5,002,396 | 3/1991 | Ozawa | 356/375 |
| 5,311,288 | 5/1994 | Shahar | 356/375 |
| 5,317,388 | 5/1994 | Surka et al. | 356/375 |
| 5,448,359 | 9/1995 | Schick et al. | 356/375 |
| 5,532,824 | 7/1996 | Harvey et al. | 356/375 |
| 5,648,852 | 7/1997 | Kato et al. | 356/375 |

*Primary Examiner*—Robert Kim
*Assistant Examiner*—Zandra V. Smith
*Attorney, Agent, or Firm*—Maginot, Addison & Moore

[57] ABSTRACT

A displacement sensor measures displacement or distance in a plurality of orthogonal directions. In one embodiment, the present invention comprises an apparatus for determining a distance to an object. The apparatus includes a sensor housing, an optical source, an optical detector, and a means for selectively redirecting incident and reflected light. In particular, the optical source is affixed to the sensor housing and generates an incident light beam. The optical detector is also affixed to the sensor housing and detects a reflected light beam, said reflected light beam comprising a portion of the incident light beam reflected off of an object to be measured. The optical detector is further operable to generate an information signal containing information pertaining to one or more characteristics of the reflected light beam. The means for selectively redirecting the incident and reflected light beam redirects the light beams in a plurality of orthogonal directions with respect to the sensor housing, thereby allowing the apparatus to determine information pertaining to the object, such as the distance thereto, in a plurality of orthogonal directions with respect to the sensor housing.

21 Claims, 5 Drawing Sheets

DISPLACEMENT SENSOR

GOVERNMENT LICENSE

The U.S. Government has a paid-up license in this invention and the right in limited circumstances to require the patent owner to license others on reasonable terms, as provided by the terms of Government Contract DTMA 91-94-H-00019, awarded by the U.S. Department of Transportation, Maritime Administration.

FIELD OF THE INVENTION

The present invention relates to optical sensors, and in particular, a multi-axis displacement sensor.

BACKGROUND OF THE INVENTION

The robotics field and the automated processes field employ optical position sensors to obtain position information about workpieces, equipment, and the like. One application of optical position sensors is in the field of robotic welding. In robotic welding equipment, one or more optical position sensors may be used to determine the location and orientation of the workpiece in robot coordinate space. Robot coordinate space is a frame of reference in which a robotic controller defines location and orientation. For example, a robot controller may use a Cartesian coordinate system as robot coordinate space, wherein each point in space is defined by three variables (X, Y, Z).

Optical sensors obtain location and orientation information using one or more measurements of displacement between the sensor and the object being measured. Displacement measurements not only provide relative location, but also orientation and shape information when a sufficient number of data points on the object have been measured. For example, it is known that three displacement measurements of a planar surface define the precise location and orientation of that surface. In other words, if the distance from three known points to three points of a planar surface are measured, the orientation of the planar surface may be determined.

A common type of sensor is a reflective light sensor, such as the reflective light sensor 10 shown in FIG. 1. The reflective light sensor comprises a light source 11 and light detector 12 located on a sensor housing 14. The light source 11 generates a light beam 16 that is intended to strike the object to be measured, such as a surface 18, at an angle slightly less than orthogonal or 90°. The light 16 reflects off of the surface 18 and strikes the light detector 12. The distance or displacement between the housing 14 and the surface 18 can be determined by the position on the detector 12 upon which the reflected light strikes the detector 12.

The accuracy of the above described measurement depends in part on the assumption that the sensor housing 14 is aligned in a predetermined orientation with respect to the surface. If the orientation of the sensor housing 14 misaligned with respect to the surface, the measured distance to surface 18 will be inaccurate. This point may be illustrated by considering a rotation of the surface 18 in FIG. 1 about a horizontal axis that includes the point where the light beam 16 intersects the surface 18. With only slight rotation, it is apparent that the reflected light beam will strike the light detector 12 in a different spot while the actual distance to the intersection point does not change. Because the reflected light beam strikes a different spot on the detector 12, the reflective light sensor 10 will calculate a different and inaccurate distance. Accordingly, proper alignment of the sensor housing 14 is an important factor in achieving accurate measurements.

A more significant drawback of the reflective light sensor 10 shown in FIG. 1 is that the sensor 10 is only capable of taking a distance measurement in a single orthogonal direction with respect to the housing 14. Specifically, the reflective light sensor 10 can only take measurements in the horizontal or "x" direction. This drawback, combined with the requirement of proper alignment, may prevent or restrict use of the sensor in many applications.

For example, consider an automated process involving the measurement of a plurality of surfaces that are oriented in a plurality of directions. In particular, consider a robotic welding process in which a first surface is to be welded onto a second surface to form a fillet weld. In such a situation, a reflective light sensor may be used to determine the location of the weld spot in a process known as corner location. In corner location, the reflective light sensor calculates the distance from a reference point to each surface and then applies algebraic relationships to determine the location of the intersection of the surfaces. To measure the distance to each of the two surfaces, the sensor 10 of FIG. 1 must be aligned to a predefined orientation with respect to the first surface, take the measurement, and then be realigned to a predefined orientation with respect to the second surface and take the measurement. The realignment is both time consuming and may be mechanically difficult to achieve due to space constraints. Moreover, realignment of the reflective light sensor introduces a source of error in the corner location calculations because of tolerances inherent to each alignment operation. It would therefore be useful to have a reflective light sensor in such a situation that could perform orthogonal measurements without realignment.

U.S. Pat. No. 5,448,359 to Schick et al. shows an optical distance sensor that includes means for scanning a measurement light beam with respect to the sensor housing. In particular, the Schick et al. device includes a polygonal mirror placed within the path of the measurement beam. The polygonal mirror rotates to effectuate beam scanning. The use of the rotating mirror, however, limits the angular range of beam deflection. The sensor must still be arranged more or less in one particular predefined orientation with respect to the object to be measured.

A need, therefore, exists for a reflective light sensor that can more easily measure a plurality of differently oriented surfaces.

SUMMARY OF THE INVENTION

The present invention fulfills the above as well as other needs by providing a displacement sensor that can measure displacement or distance in a plurality of orthogonal directions. The ability to take measurements in a plurality of orthogonal directions allows for flexible alignment of the optical sensor for a particular application. For example, a sensor according to the present invention that is capable of taking measurements in three orthogonal directions may be positioned in any one of the three possible alignments to take a particular measurement.

In one embodiment, the present invention comprises an apparatus for determining a distance to an object. The apparatus includes a sensor housing, an optical source, an optical detector, and a means for selectively redirecting incident and reflected light. In particular, the optical source is affixed to the sensor housing and generates an incident light beam. The optical detector is also affixed to the sensor housing and detects a reflected light beam, said reflected light beam comprising a portion of the incident light beam reflected off of an object to be measured. The optical detector is further operable to generate an information signal containing information pertaining to one or more characteristics of the reflected light beam. The means for selectively redirecting the incident and reflected light beam redirects the light beams in a plurality of orthogonal directions with respect to the sensor housing, thereby allowing the apparatus to determine information pertaining to the object, such as the distance thereto, in a plurality of orthogonal directions with respect to the sensor housing.

A processing circuit may also be operably connected to both receive the information signal and control means for selectively redirecting the incident and reflected light. Such a processing circuit may be operable to cause the means for selectively redirecting the incident and reflected light beam to redirect the light beam for particular orthogonal measurements. The processing circuit may further be operable to apply geometric and algebraic relationships to the received information signal in order to determine a corner location between two or three intersecting planar surfaces. In a preferred embodiment, the optical source comprises a laser, and in particular, an infrared laser. Moreover, the means for redirecting the incident and reflected light beams preferably comprises a plurality of retractable mirrors.

In an exemplary method according to the present invention, a displacement sensor may determine the location of an intersection between two objects without realignment between distance measurements. Specifically, the present invention features a method of determining the location of an intersection between first and second surfaces.

The method first includes a step of positioning a displacement sensor in a first identified location and orientation with respect to the first and second surfaces. Then, a first displacement measurement is taken of the first surface in a first direction using the displacement sensor. Next, a second displacement measurement is taken of the second surface in a second direction using the displacement sensor. Finally, the method concludes with the step of determining a location of the intersection between the first and second surfaces using the first displacement measurement, the second displacement measurement, and the first identified location and orientation of the displacement sensor.

The above features and advantages of the present invention, as will as others, will become more readily apparent to those of ordinary skill in the art by reference to the detailed description and accompanying drawings.

DETAILED DESCRIPTION

Figure 2:
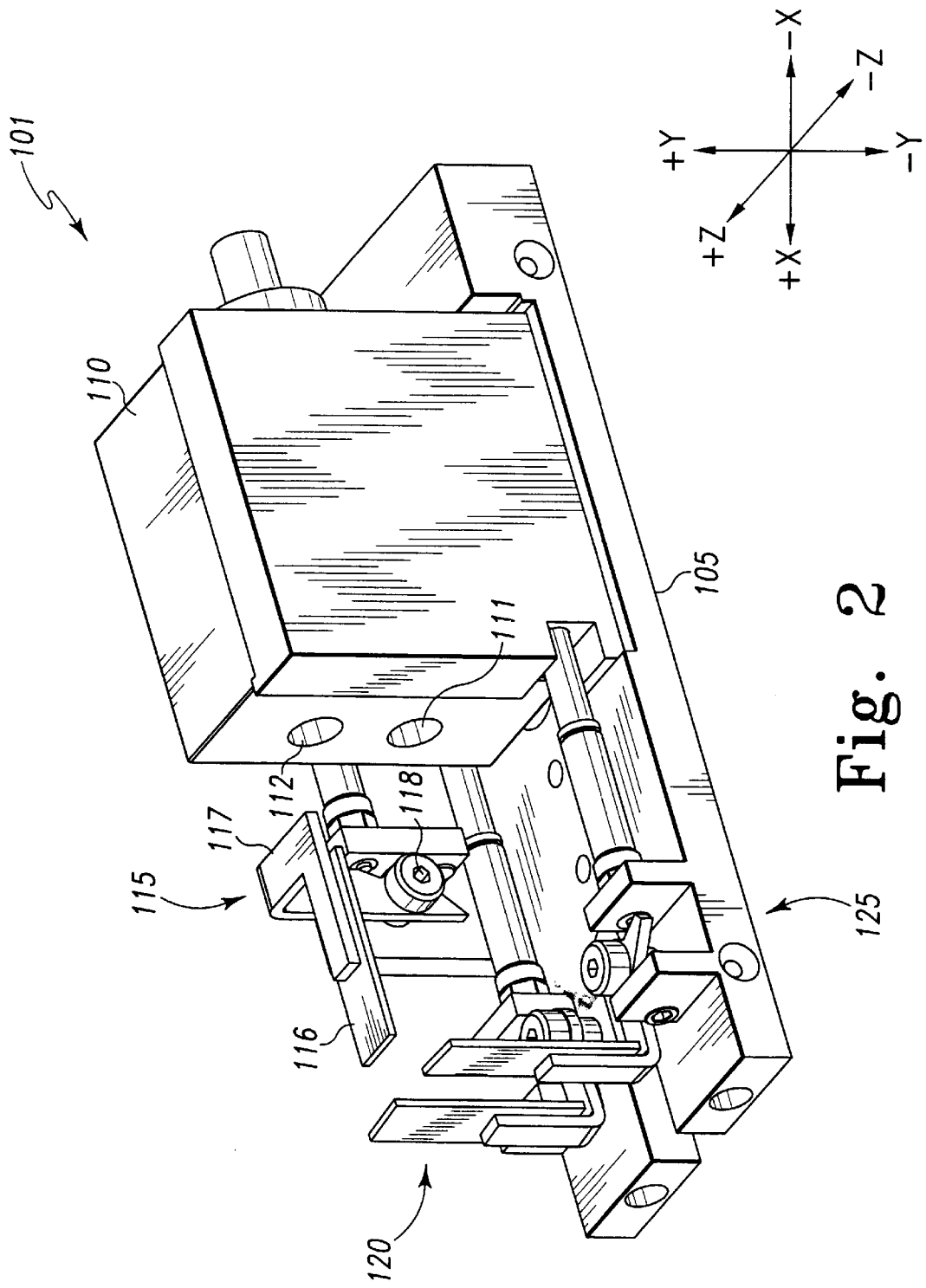
FIG. 2 shows an exemplary displacement sensor according to the present invention.

FIG. 2 shows an exemplary displacement sensor 101 according to the present invention. The displacement sensor 101 is operable to perform displacement measurements on objects located in a plurality of orthogonal directions with respect to the sensor 101. For example, the displacement sensor 101 can take displacement measurements of points on objects located directly in front of (+x direction), below (−y direction) or on either side of (+z and −z directions) the displacement sensor 101 without realignment of the displacement sensor 101.

The displacement sensor 101 includes a sensor housing 105. Affixed to the sensor housing 105 are a linear sensor 110, a first movable mirror assembly 115, a second movable mirror assembly 120, and a third movable mirror assembly 125. The linear sensor 110 further comprises an optical source 111 for transmitting an incident light beam to a point on the object to be measured and an optical detector 112 for detecting a reflected light beam, said reflected light beam comprising a portion of the incident light beam reflected off of the object being measured. The linear sensor 110, and in particular, the optical detector 112, further comprises internal circuitry, not shown, operable to generate an information signal containing information pertaining to one or more characteristics of the reflected light beam. The linear sensor 110 may suitably be a model 3Z4M-S22 available from Omron. The Omron linear sensor produces an information signal that contains displacement information.

The first, second and third movable mirror assemblies 115, 120 and 125 each comprise means for selectively redirecting the incident and reflected light beams generated and detected by, respectively, the optical source 111 and optical detector 112. For example, the first movable mirror assembly 115 may either be in a retracted position (as shown), in which it does not redirect the incident and reflected light beams, or an actuated position, in which it redirects the light beams to effectuate a displacement measurement in the −y direction. Likewise, the second movable mirror assembly 120, when actuated, redirects the light beams to effectuate a displacement measurement in the −z direction. The third movable mirror assembly 125, when actuated, effectuates measurements in the +z direction. The third movable mirror assembly 125 is shown in the actuated position in FIG. 2

In alternative embodiments, other movable mirror assemblies may be added that selectively redirect light beams in other directions, such as the +y direction. While such an embodiment may provide still further flexibility in orientation, the added structural complexity may not justify the additional flexibility. In fact, it may be advantageous in some circumstances to include fewer movable mirror assemblies. For example, if it is known that the sensor will be used in configurations that only require measurements in two orthogonal directions, then only one retractable mirror would be required.

In this exemplary embodiment, the first movable mirror assembly 115 includes a mirror 116 and a mirror bracket 117 rotatably connected to a pivot axis 118. The pivot axis 118 is affixed to the sensor housing 105 such that the axis of rotation of the mirror bracket 117 extends in the z direction. In general, to move the mirror to the actuated position, the mirror bracket 117 rotates about the pivot axis 118, causing radial movement of the mirror 116. The mirror 116 continues to move radially until it reaches a predefined position that interrupts the light beam path. In a preferred embodiment, the mirror 116 ceases radial movement when the plane of the mirror 116 is at a 45° angle with respect to the light beam path.

It will be noted that the first mirror assembly 115 described herein is given by way of example only. Other movable mirror assemblies may readily be devised that use the mirror movement to cause the mirror to selectively intersect the light beam path and thereby selectively redirect the light beams used for measurement.

Figure 3:
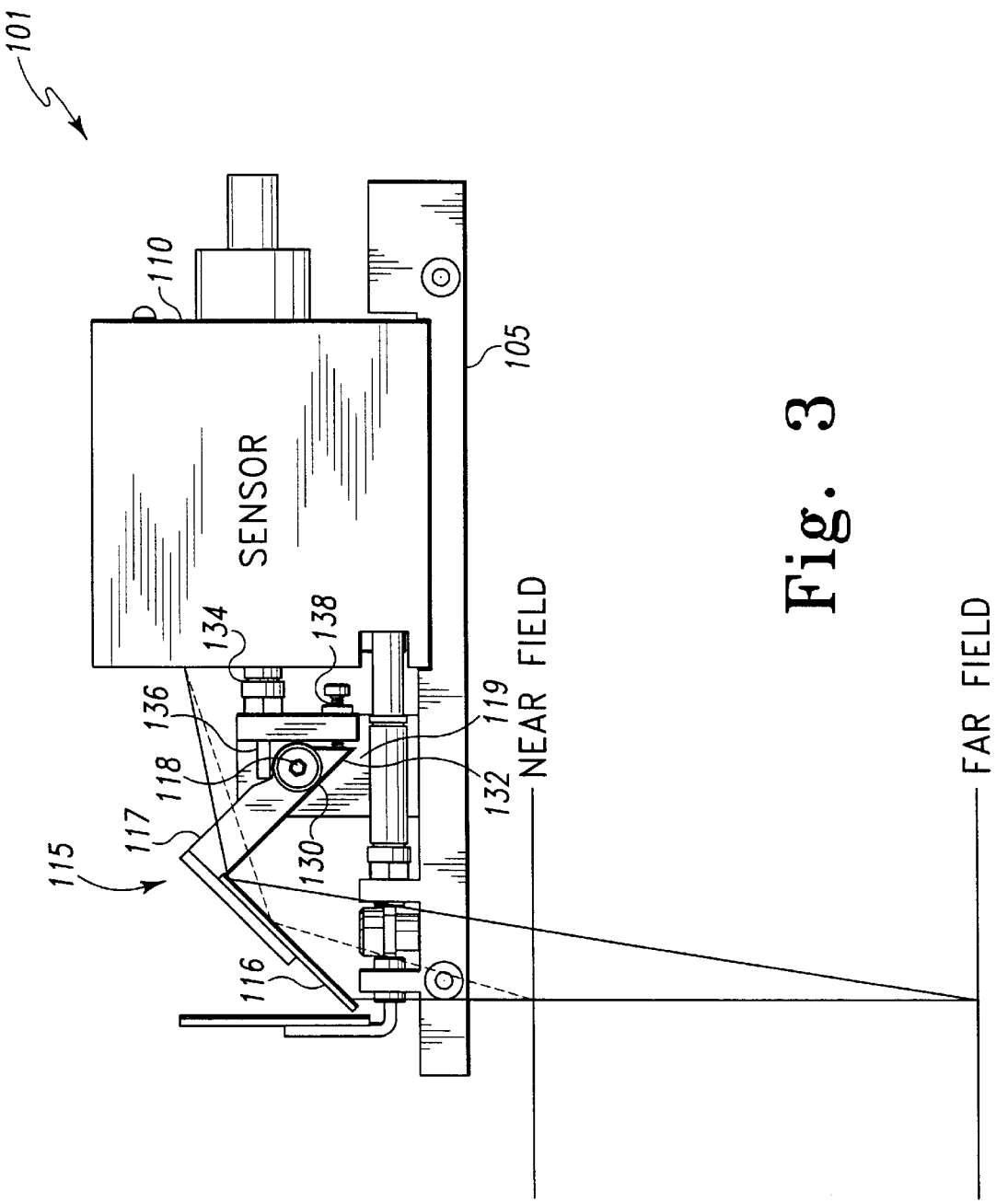
FIG. 3 shows a side view of the displacement sensor of FIG. 2 and includes further detail of a first movable mirror assembly in accordance with the present invention.

FIG. 3 shows a side view of the displacement sensor 101 and includes further detail of the exemplary embodiment of the first movable mirror assembly 115. As illustrated, the mirror bracket 117 is essentially an L-shaped bracket with one leg of the L-shaped bracket attached to and generally coplanar with the mirror 116. The other leg of the L-shaped bracket 117 terminates in a rounded portion 130. The rounded portion 130 has a central opening which is received by the pivot axis 118. The rounded portion 130 further includes a radially extending cam 132. The pivot axis 118 is securely affixed to the housing 105 by a vertical bracket 119. Also attached to either the linear sensor 110 or the sensor housing 105 is a pneumatic cylinder 134. The pneumatic cylinder 134 includes an extendable actuator or piston 136, and is oriented such that the piston 136 engages and exerts force upon the mirror bracket 117 when actuated. The connection between the circular portion 130 of the mirror bracket 117 and the pivot axis 118 also includes a return spring, not shown. The return spring comprises a circular wire-type spring having radius larger than the pivot axis 118. The return spring is advantageously positioned to exert a torque-force to the mirror bracket 117 opposite the torque-force exerted by the pneumatic cylinder 134 and piston 136, or in other words, a clockwise torque-force.

In operation, to take displacement measurements in the −y direction, a control device, not shown, but which may suitably be a processor and driver circuit, provides a signal that causes actuation of the pneumatic cylinder 134. Actuation of the pneumatic cylinder 134 causes the piston 136 to exert torque on the mirror bracket 117, thereby causing the mirror bracket 117 to rotate about the pivot axis 118. As the mirror bracket 117 rotates, the mirror 116 lowers into the projected path of the incident (and reflected) measurement light beams.

To obtain a true orthogonal measurement in the −y direction, the mirror 116 is positioned at a 45° angle with respect to the x direction, as illustrated. An adjustable stop 138 is provided and affixed to the sensor housing 105 that engages the cam 132 at a point in which the mirror 116 is properly positioned. The adjustable stop 138 may suitably comprise a screw rotatably inserted into a bracket. The first movable mirror assembly 115 may be calibrated by turning the screw until the stop position of the mirror 116 is precisely 45°.

In a preferred embodiment, a precise calibration method is employed to insure the accuracy of the displacement sensor. Precise calibration is accomplished by measuring the displacement of an object at a known distance, observing the measured results, and adjusting the adjustable stop 138 until the measurement is sufficiently in agreement with the known distance. Instead of using an object at a known distance, a precise calibration fixture may be used. Those of ordinary skill in the art may readily calibrate the first movable mirror assembly 115 using these or other similar methods.

Once the linear sensor 110 obtains sufficient data to make a displacement measurement in the −y direction, the control circuit causes the pneumatic cylinder 134 to retract the piston 136. As the piston 136 retracts, the return spring forces the mirror bracket 117 to rotate clockwise until the mirror 116 is in retracted position.

Figure 4:
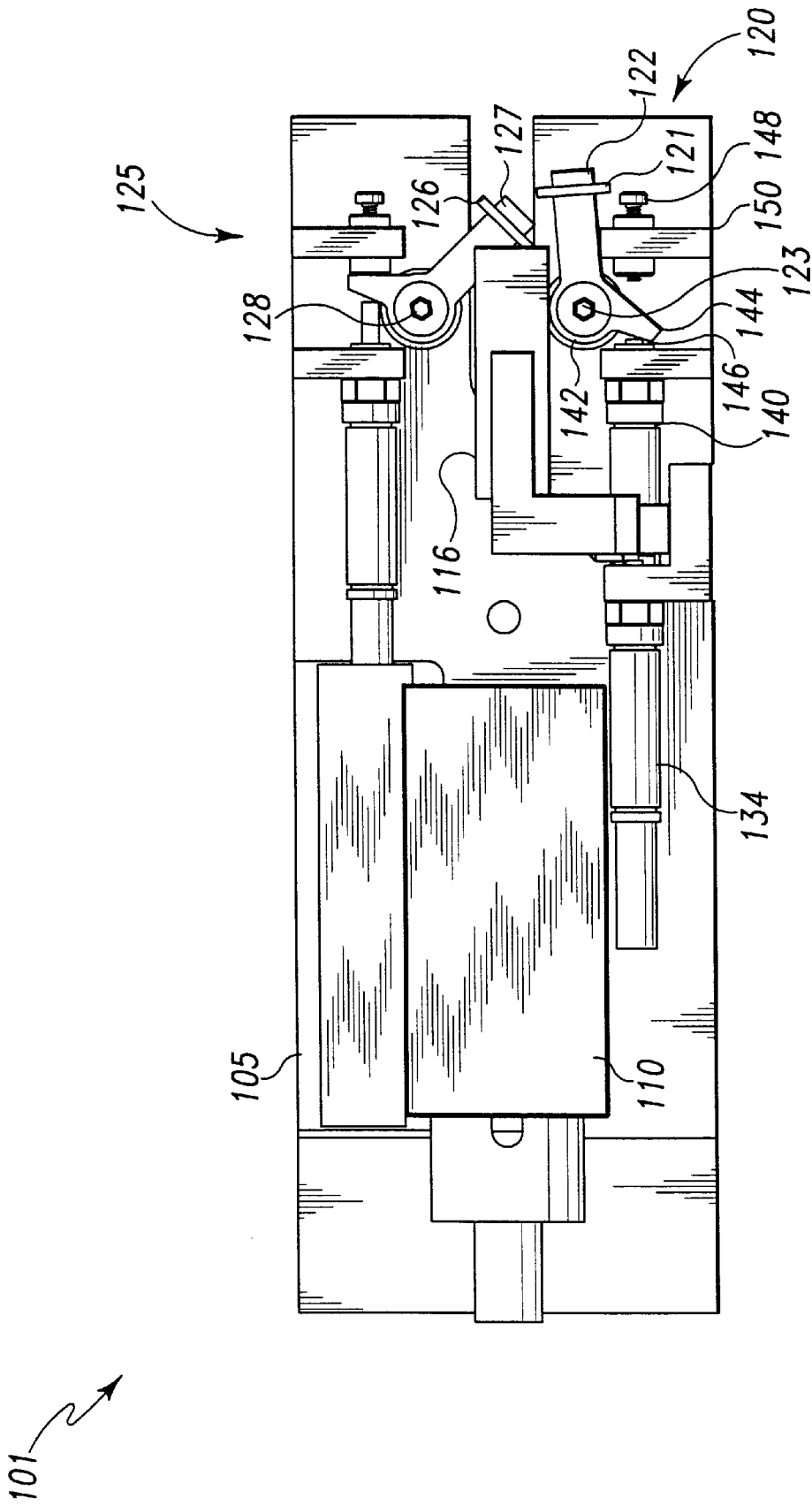
FIG. 4 shows a top-view perspective of the displacement sensor of FIG. 2 and provides further detail of a second movable mirror assembly and a third movable mirror assembly according to the present invention.

Referring again to FIG. 2, the second and third movable mirror assemblies 120 and 125, respectively, facilitate redirection of the light beam in the +z and −z direction. FIG. 4 shows a top-view of the displacement sensor 101 including further detail of the second movable mirror assembly 120 and the third movable assembly 125. The second movable mirror assembly includes a second mirror 121, a mirror bracket 122, a pivot axis 123, and a pneumatic cylinder 140. As illustrated, the mirror bracket 122 has a rectangular end, which is attached to and is perpendicular to the mirror 121, and a rounded end 142. The rounded end 142 has a central opening which is received by the pivot axis 123. The rounded end 142 further includes a cam 144. The pivot axis 123 is securely affixed to the housing 105 such that its axis is in a generally vertical orientation, or in other words, its radial axis is in the y direction. The pivot axis 123 is located on a first side of the sensor housing 105 adjacent to the intended path of the incident and reflected light beams.

The pneumatic cylinder 140 is also attached to the sensor housing 105. The pneumatic cylinder 140 includes an extendable actuator or piston 146, and is oriented such that the piston 146 engages and exerts force upon the cam 144 when actuated. The connection between the rounded end 130 of the mirror bracket 122 and the pivot axis 123 also includes a return spring, not shown. The return spring comprises a circular wire spring or the like that exerts a clockwise torque-force on the mirror bracket.

In operation, to take displacement measurements in the −y direction, a control device, not shown, but which may suitably be a processor and driver circuit combination, provides a signal that causes actuation of the pneumatic cylinder 140. Actuation of the pneumatic cylinder 140 causes the piston to exert a torque-force on the cam 144, thereby causing the mirror bracket 122 to rotate about the pivot axis 123 in a counterclockwise direction. As the mirror bracket 122 rotates, the mirror 121 rotates into the projected path of the incident (and reflected) measurement light beams.

To obtain a true orthogonal measurement in the −z direction, the mirror 121 should be positioned at a 45° angle with respect to the x direction, as illustrated. An adjustable stop 148 is provided and affixed to the sensor housing 105 that engages the cam 144 at a point in which the mirror 121 is properly positioned. The adjustable stop 148 may suitably comprise a screw rotatably inserted into a bracket. The first retractable mirror assembly may be calibrated by rotating the screw until the stop position of the mirror 121 is precisely 45.

Once the linear sensor 110 has taken sufficient data to make a displacement measurement in the −y direction, the control circuit causes the pneumatic cylinder 140 to retract the piston 146. As the piston 146 retracts, the return spring 149 forces the mirror bracket 122 to rotate clockwise until the mirror 121 returns to its in retracted position.

The third movable mirror assembly 125 has a structure similar to that of the second movable mirror assembly 120, and includes, among other things, a third mirror 126 and a connected mirror bracket 127, both of which rotate about a pivot axis 128. In the case of the third movable mirror assembly 125, the pivot axis 128 is positioned opposite the pivot axis 123, or in other words, on a second side of the housing 105 and adjacent to the intended path of the light beams. The mirror bracket 127 and mirror 126 rotate clockwise to interrupt the light beams. When so positioned, the light beams are properly redirected to take displacement measurements in the +z direction. The operation of the third movable mirror assembly 125 is otherwise similar to the operation of the second movable mirror assembly 120, discussed above.

It will be noted that the use of pneumatic cylinders in the present embodiment to impart movement to the mirrors is given by way of example only. The pneumatic cylinders may optionally be replaced by solenoids or other controllable actuators.

The displacement sensor 101 of the present invention thus has the capability of taking displacement measurements in a plurality of orthogonal directions without requiring repositioning of the sensor housing. Such capability provides for flexibility in the use of the sensor. One advantage pertains to the flexibility of positioning the displacement sensor for a measurement. Specifically, orientation of the sensor housing may be made to best accommodate the wires and cables associated with the sensor. By contrast, prior art sensors limited to taking measurements in one orthogonal direction must be located in a single predefined relationship with the object being measured. That single predefined relationship may not be compatible with the cabling or with the reach of a robot arm that manipulates the sensor.

For example, consider a measurement of an object that is positioned in a tight location. Because prior art sensors can only take measurements in one direction, it may be impossible to position a prior art sensor within the tight location to take the measurement. Specifically, the cabling to the sensor and the sensor housing itself may prohibit proper physical orientation of the sensor to take the measurement. By contrast, the sensor of the present invention may select from a plurality of orientations with respect to the surface to be measured, thereby increasing the odds that one of those orientations will be compatible with the cabling and sensor housing positioning limitations.

Figure 5A:
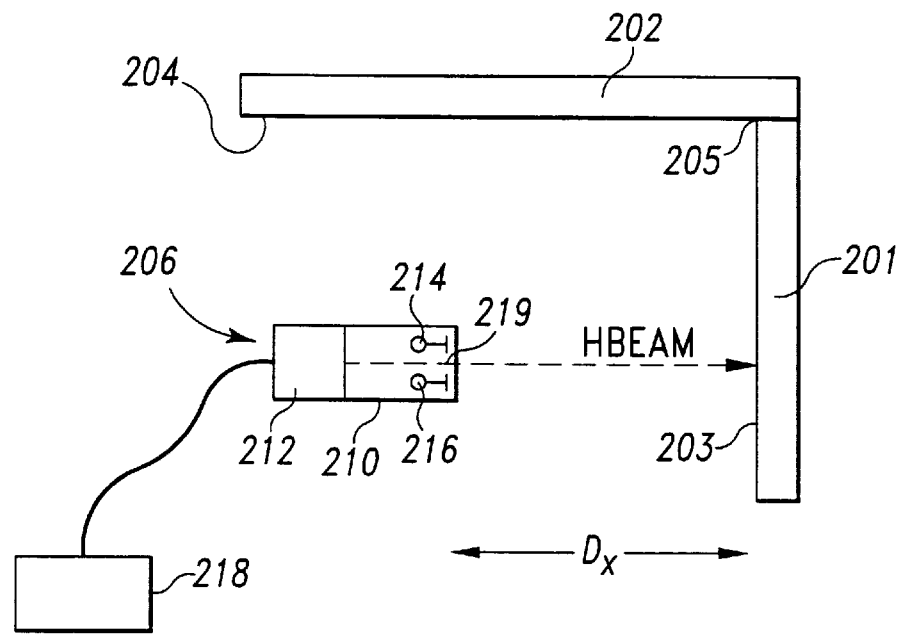
FIG. 5a and 5b show a displacement sensor employed in a corner location process in accordance with the present invention.
Figure 5B:
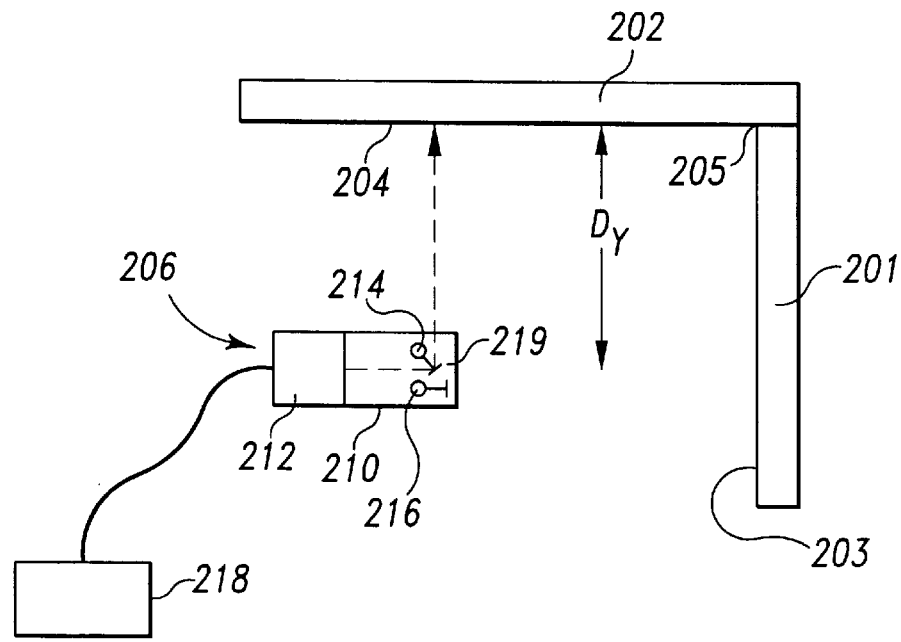

Another advantage of the present invention is manifested in automated robotic welding operations. Specifically, the sensor of the present invention is particularly useful in a corner location operation. As discussed above, corner location is a process in which a displacement sensor determines the location (and sometimes orientation) of the intersection of two (or three) perpendicular plates to be welded. FIGS. 5a and 5b illustrate an exemplary two plate corner location process using a sensor according to the present invention.

Referring to FIG. 5a, a first object 201 and a second object 202 may suitably be metallic plates or members to be welded. The first object 201 has at least a front surface 203 that is substantially vertical, and the second object 202 has a bottom surface 204 that is substantially horizontal. Thus, for example, the first object 201 and second object 202 may each comprise rectangular lengths of metal, shown in FIGS. 5a and 5b in cross section. The first object 201 and second object 202 are disposed adjacent to and perpendicular to each other, and more particularly, such that the surface 203 of the first object 201 and the bottom surface 204 of the second object 202 are perpendicular to each other. The intersection of the front surface 203 and the bottom surface 204 defines a corner 205.

The corner 205 defines the location to be welded. The desired welding operation in this example is a fillet weld that connects the first object 201 and the second object 202 in more or less perpendicular orientation.

Figure 1:
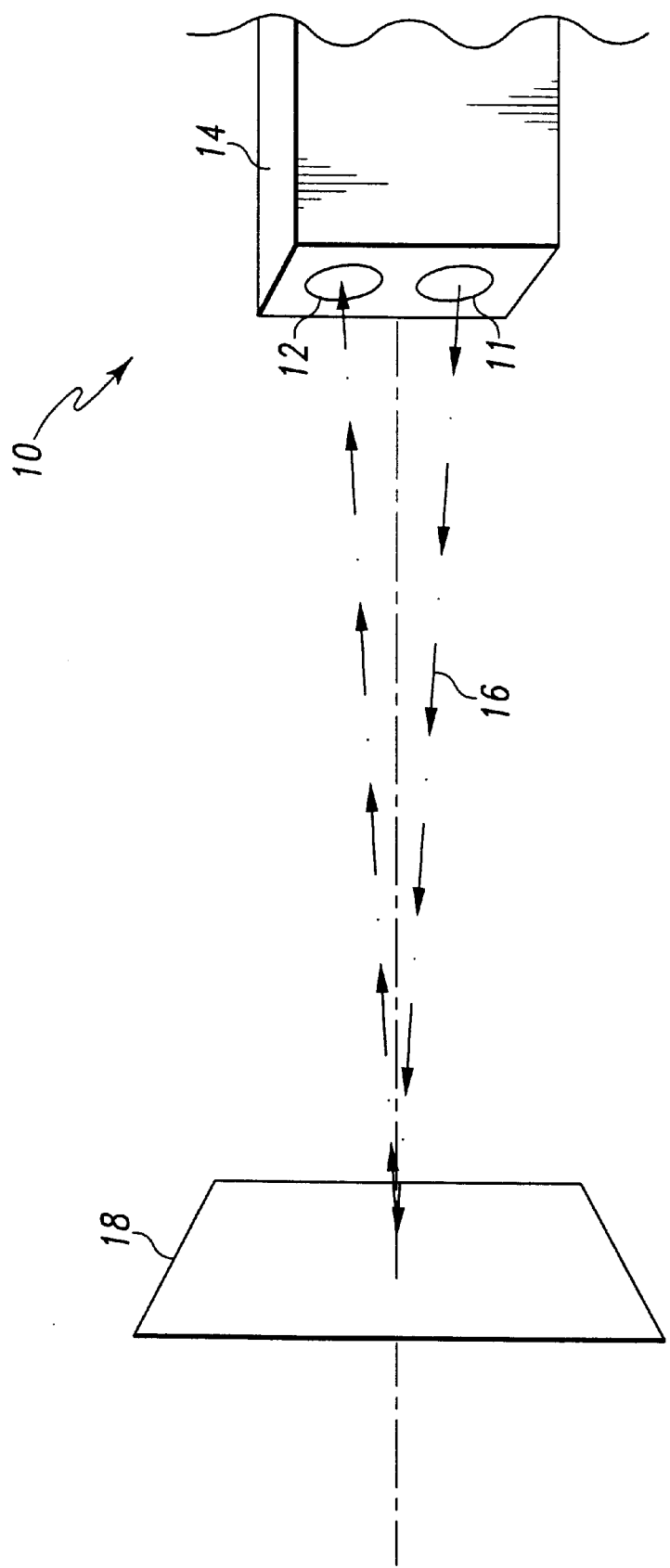
FIG. 1 shows an exemplary prior art reflective light sensor.

FIGS. 5a and 5b also show a displacement sensor 206 according to the present invention. The displacement sensor 206 includes a housing 210, a linear sensor 212, which may suitable be the linear sensor 110 from FIG. 1, and a light redirecting means 214 for redirecting incident and reflected light, which may suitably be the second movable mirror assembly 120 of FIGS. 2 and 4. The displacement sensor 206 also includes a processing circuit 218, which may or may not be rigidly affixed to the housing 210. The processing circuit 218 is operable to control the operation of the displacement sensor 206 and performs calculations based on information signals received from the linear sensor 212. The displacement sensor 206 may also include other light beam redirection means 216, and other such means not shown, which are not required for the exemplary corner location technique discussed herein.

The robot coordinate space in this exemplary operation is defined as a three-dimensional Cartesian coordinate space in which each point is defined by an x-value, a y-value, and a z-value, or (X, Y, Z). The robot coordinate space is chosen such that the surface 203 falls within the orthogonal x-plane, i.e., that planar definition is (X0, Y, Z) where Y and Z may be any value. Furthermore, the robot coordinate space is chosen such that the surface 204 falls within the orthogonal y-plane, i.e., the planar definition is (X, Y0, Z), where X and Z may be any value.

In operation, the displacement sensor 206 is first positioned or oriented such that the object surfaces 203 and 204 are each substantially perpendicular to one or more orthogonal lines extending from the linear sensor 212. In FIG. 5a, for example, the surface 203 is substantially perpendicular to a horizontal orthogonal line extending from the linear sensor 212 and the bottom surface 204 is substantially perpendicular to a vertical orthogonal line extending from the linear sensor 212. The displacement sensor 206 may be manually, but, preferably automatically, positioned by a robotic arm or the like, not shown. For the purposes of the exemplary method described herein, the position of the displacement sensor 206 is actually the position of a reference point 219, which is located at the point where the light beam redirecting means 214, when actuated, intersects measurement light beams. The reference point 219 has a known value and is defined herein as (X1, Y1, Z1).

Once the displacement sensor 206 is properly positioned, then the displacement sensor 206 takes a first orthogonal displacement measurement. In particular, as shown in FIG. 5a, the linear sensor 212, under the control of the processor 218, generates and detects a measurement light beam HBEAM which provides, as is known in the art and discussed above, a displacement measurement to the front surface 203. For this measurement, the light beam is not redirected by light beam redirection means 214, and travels substantially horizontally, or in the X-direction. The linear sensor 212 is detects the reflected light beam and generates an information signal therefrom. The information signal contains information pertaining to the front surface 203. In a preferred embodiment, the information signal contains information representative of the distance DX wherein represents the distance from the reference point 219 (X1, Y1, Z1) to corresponding point (X0, Y1, Z1) on the front surface 203.

Once the measurement is taken, the displacement sensor 206 takes second orthogonal displacement measurement, as illustrated, for example, in FIG. 5b. To this end, the processing circuit 218 first causes the light beam redirecting means 214 to configure itself to intercept the path of the measurement light beam generated by and reflected to the linear sensor 212. The linear sensor 212, under the control of the processor 218, then generates another measurement light beam VBEAM. The light beam redirecting means 214 redirects VBEAM in the vertical or Y-direction towards the bottom surface 204 of the second object 202. The linear sensor 212 then detects the reflected light beam and generates a second information signal therefrom. The information signal contains the distance DY, which is representative of the distance from the reference point 219 (X1, Y1, Z1) to the corresponding point (X1, Y0, Z1) on the bottom surface 204.

The processing circuit 218, having received DX and DY from the linear sensor 212, then determines the location of the corner 205. In other words, the processing circuit generates a corner definition in robot coordinate space using the DX and DY information. For example, if the location of the sensor housing reference point 219 is (X1, Y1, Z1), where X1 is the horizontal coordinate and Y1 is the vertical coordinate, then the processing circuit 218 defines the corner as a line having a definition of (X1+DX, Y1+DY, Z), where Z has a range equal to the depth dimension of the plates 201 and 202.

The corner location method and apparatus described above may furthermore be used to determine a corner point, as opposed to a line, that is defined by three intersecting plates or surfaces. To this end, the displacement sensor 206 would include another mirror assembly to effectuate measurements in the Z-direction. For example, the displacement sensor 101 of FIG. 2 may readily take measurements in the Z-direction as well as the X and Y directions. If a third intersecting plate is added that includes a surface in the orthogonal Z-plane, having a definition (X, Y, Z0), the third orthogonal measurement may be taken to obtain the distance DZ from the reference point 219 (X1, Y1, Z1) to the corresponding point on that surface (X1, Y1, Z0). In such a case, the processing circuit 218 would determine that the corner point has a location definition of (X1+DX, Y1+DY, Z1+DZ).

It should be noted that the method described above in connection with FIGS. 5a and 5b is equally applicable to configurations of the first object 201 and the second object 202 in which their respective surfaces intersect at angles less than the perpendicular. For example, the intersection of the first object 201 and the second object 202 may form a 100° angle. To do so, the light beam redirecting means should be adjusted to redirect the measurement light beams at the appropriate angle. If the light beam redirecting means is a retractable mirror, such as the second movable mirror assembly 120 of FIGS. 2 and 4, then piston 146 and/or the adjustable stop 148 may be configured to cause the mirror 121, when in actuated position, to direct the light beam at a different angle. The calculation performed by the processing circuit 218 to determine the corner location will naturally differ if the intersection of the first object 201 and the second object 202 define an angle of other than 90°. The proper calculation of a corner location definition given the distances to the surfaces and their angle of intersection may be readily determined by those of ordinary skill in the art using elementary geometric principles.

The method described above in connection with FIGS. 5a and 5b may also be modified to perform multiple corner locations in a single position. For example, the workpiece may comprise three objects arranged such that their cross section is a square (or rectangle) with an open end, thereby creating two corners. In such a case, the displacement sensor 206 would take a first displacement measurement, use the light beam redirecting means 214 to take a second displacement measurement, and then use the other light beam redirecting means 216 to take a third displacement measurement.

In yet another application, the displacement sensor 206 is used in an absolute corner location method. The absolute corner location method is a highly accurate method that takes into account slight misalignment or skew of the surfaces being measured. While the method described above in connection with FIGS. 5a and 5b provides a fairly accurate corner location measurement in most instances, its accuracy is greatly dependent on the accurate alignment of the two workpieces. If the workpieces are slightly misaligned, then the accuracy of the corner location method of FIGS. 5a and 5b deteriorates somewhat.

To increase the corner location accuracy, the absolute corner location method includes taking three displacement measurements for each planor surface. In general, the three displacement measurements are used to define three points in space, which in turn define the location and orientation of a planar surface, or simply, an absolute plane definition. Once the absolute plane definition for each surface is determined, the sensor 206 determines the line that defines the intersection of the planes using well known geometric principles. The absolute corner location method according to the present invention is described below for an application in which an intersecting or corner line is defined at the intersection of two surfaces.

The absolute corner location method is carried out by repeating the basic measurement techniques discussed above for corner location as described in connection with FIGS. 5a and 5b. In particular, the displacement sensor 206 is positioned such that the reference point 219 is in a known location (X1, Y1, Z1). The displacement sensor 206 then takes a first orthogonal measurement to determine a distance $DX_1$ to the front surface, and then takes a second orthogonal measurement to determine the distance $DY_1$ to the bottom surface. The displacement sensor 206 then relocates to a position such that the reference point is at a second known location (X2, Y2, Z2). Once located, the displacement sensor 206 takes a third orthogonal measurement to determine a distance $DX_2$ to the front surface 203, and then takes a fourth orthogonal displacement measurement to determine a distance $DY_2$ to the bottom surface 204. The displacement sensor 206 then relocates to a position wherein the reference 219 is at a known location (X3, Y3, Z3), and takes fifth and sixth displacement measurements to determine $DX_3$ and $DY_3$.

The processing circuit 218 then determines the absolute definition of the plane defined by the front surface using the points (X1+$DX_1$, Y1, Z1), (X2+$DX_2$, Y2, Z2) and (X3+$DX_3$, Y3, Z3) using well-known geometric relationships. Specifically, a plane is defined by the equation AX+BY+CZ=D. With three measured points, the above equation may be solved for A, B and C, thereby yielding the plane equation. Similarly, the processor 218 determines the absolute definition of the plane defined by the bottom surface 204 using the points (X1, Y1+$DY_1$, Z1), (X2, Y2+$DY_2$, Z2) and (X3, Y3 +$DY_3$, Z3). Once the absolute definitions of the two planes are determined, the processor 218 determines the definition of the line defined by the intersection of the two planes using well-known algebraic principles.

The defined line represents the absolute corner location in robot coordinate space. While the requirement of taking six measurements adds complexity, the accuracy of the absolute corner location is nevertheless greatly enhanced over the ordinary corner location method. The example, the absolute corner location method takes into account and reflects in its result any pitch or skew of the workpiece surfaces from their expected orientation.

The above absolute corner definition method may of course be extended to determine the intersection of three intersecting plates, in other words, a corner point, by adding three additional measurements. Specifically, the displacement sensor 206 would perform the absolute corner location method described above, but would take an additional measurement in a third orthogonal direction, in other words, in the z direction, at each of the points (X1, Y1, Z1), (X2, Y2, Z2) and (X3, Y3, Z3). For example, when the displacement sensor 206 is located at the first known location, it takes measurements in each of the first, second, and third orthogonal directions. The displacement sensor 206 then is repositioned to the second and third known locations and repeats the three orthogonal measurements at each location. The processor 218 would then determine the absolute plane definitions for each of the three orthogonal surfaces. Thereafter, the processor 218 would use the absolute plane definitions and known geometric relationships to determine the absolute corner definition for the point defined by the intersection of the three surfaces.

The displacement sensor 206 greatly reduces the process time in both the corner location and the absolute corner location methods described above. Prior art sensors lacking the capability to carry out measurements in a plurality of orthogonal directions must be repositioned for every measurement. Each repositioning not only requires a significant amount of process time, but also introduces error and thus reduces the accuracy of the corner location method.

It will be understood that the above described embodiments are merely illustrative, and that those of ordinary skill in the art may readily devise their own implementations that incorporate the principles of the present invention and fall within the scope and spirit thereof. For example, the location and orientation information generated by the displacement sensor according to the present invention is in no way limited to use in connection with welding operations. Robotic painting, cleaning, glue setting, as well as other operations may similarly benefit from the displacement sensor according to the present invention. Moreover, the displacement sensor according to the present invention may be incorporated to other devices that are required to generate high accuracy measurements, including but not limited to coordinate measurement machines and the like.

We claim:

1. An apparatus for determining information pertaining to one or more objects, the apparatus comprising:
   a) a sensor housing;
   b) a linear sensor affixed to the sensor housing, said linear sensor operable to transmit an incident light beam to a point on at least one of the one or more objects,
   detect a reflected light beam, said reflected light beam comprising a portion of the incident light beam reflected off of the at least one object, and
   generate an information signal containing information pertaining to the at least one object based on detected reflected light beam;
   c) means operably connected to the sensor housing for selectively redirecting the incident and reflected light beam in a plurality of orthogonal directions with respect to the sensor housing, thereby allowing the apparatus to determine information pertaining to the at least one object, wherein the at least one object is disposed in any of the plurality of orthogonal directions with respect to the sensor housing.

2. The apparatus of claim 1 wherein the linear sensor is further operable to determine the distance to the at least one object based upon the information signal.

3. The apparatus of claim 1 wherein the linear sensor further comprises a laser operable to generate the transmitted incident light beam.

4. The apparatus of claim 1 wherein the means for selectively redirecting the incident and reflected light beam includes at least one movable mirror.

5. The apparatus of claim 1 wherein the means for selectively redirecting the incident and reflected light beam includes at least two movable mirrors and is operable to selectively redirect the incident and reflected light such that incident and reflected light may be directed in at least three orthogonal directions.

6. The apparatus of claim 4 further comprising:
   e) at least one bracket connected to each of the at least one movable mirror;
   f) a pivot axis connected to each bracket and rotatably connected to the sensor housing; and
   g) a means for partially rotating each pivot axis to effectuate movement of each of the at least one movable mirror.

7. The apparatus of claim 1 further comprising a processing circuit operable to cause the means for selectively redirecting the incident and reflected light beam to selectively redirect the indecent and reflected light beam in a first orthogonal direction.

8. The apparatus of claim 1 further comprising a processing circuit operable to:
   receive a first information signal from the linear sensor, said first information signal containing information pertaining a first of said one or more objects;
   cause the means for selectively redirecting the incident and reflected light beam to selectively redirect the incident and reflected light beam in a second orthogonal direction;
   receive a second information signal from the linear sensor, said second information signal containing information pertaining to a second of said on or more objects;
   determine a location of an intersection between the first object and the second object using the first information signal and the second information signal.

9. The apparatus of claim 1 further comprising a processing circuit operable to
   receive a first information signal from the linear sensor, said first information signal containing information pertaining a first of said one or more objects;
   cause the means for selectively redirecting the incident and reflected light beam to selectively redirect the incident and reflected light beam in a second orthogonal direction;
   receive a second information signal from the linear sensor, said second information signal containing information pertaining to a second of said on or more objects;
   cause the means for selectively redirecting the incident and reflected light beam to selectively redirect the incident and reflected light beam in a third orthogonal direction;
   receive a third information signal from the linear sensor, said third information signal containing information pertaining to a third of said on or more objects;
   determine a location of an intersection between the first object, the second object, and the third object using the first information signal, the second information signal, and the third information signal.

10. An apparatus for determining a distance to an object, the apparatus comprising:
    a) a sensor housing;
    b) an optical source affixed to the sensor housing for generating an incident light beam;
    c) an optical detector affixed to the sensor housing for detecting a reflected light beam, said reflected light beam comprising a portion of the incident light beam reflected off of an object to be measured, the said optical detector operable degenerate an information signal containing information pertaining to one or more characteristics of the reflected light beam;

d) means for selectively redirecting the incident and reflected light beam in a plurality of orthogonal directions with respect to the sensor housing, thereby allowing the apparatus to determine the distance to the object, wherein the object is disposed in any of the plurality of orthogonal directions with respect to the sensor housing; and e) a processing circuit operably connected to control the means for selectively redirecting the incident and reflected light beam.

11. The apparatus of claim 10 wherein the optical source comprises a laser.

12. The apparatus of claim 10 wherein the optical detector is operable to generate an information signal containing information representative of a distance to an object.

13. The apparatus of claim 10 wherein the means for selectively redirecting the incident and reflected light includes at least one movable mirror.

14. The apparatus of claim 13 further comprising:

f) at least one bracket connected to each of the at least one movable mirror;

g) a pivot axis connected to each bracket and rotatably connected to the sensor housing; and h) a means for partially rotating each pivot axis to effectuate movement of each of the at least one movable mirror.

15. The apparatus of claim 14 wherein the means for partially rotating each pivot axis comprises a pneumatic cylinder.

16. A method of determining the location of an intersection between a plurality of surfaces, the method comprising:

a) positioning a displacement sensor in a first identified location and orientation with respect to the plurality of surfaces;

b) taking a first displacement measurement with respect to a first surface of the plurality of surfaces in a first direction using the displacement sensor;

c) taking a second displacement measurement with respect to a second surface of the plurality of surfaces in a second direction using the displacement sensor; and d) determining a location of the intersection between the plurality of surfaces with respect to the first identified location and orientation of the displacement sensor using the first displacement measurement and the second displacement measurement.

17. The method of claim 16 further comprising, after step c), taking a third displacement measurement with respect to a third surface of the plurality of surfaces in a third direction using the displacement sensor, and wherein step d) further comprises determining a location of the intersection between the plurality of surfaces with respect to the first identified location and orientation of the displacement sensor using the first displacement measurement, the second displacement measurement, and the third displacement measurement.

18. The method of claim 16 further comprising, after step c):

positioning the displacement sensor in a second identified location and orientation with respect to the first and second surfaces;

taking a third displacement measurement with respect to the first surface in the first direction using the displacement sensor;

taking a fourth displacement measurement with respect to the second surface in the second direction using the displacement sensor;

positioning the displacement sensor in a third identified location and orientation with respect to the first and second surfaces;

taking a fifth displacement measurement with respect to the first surface in the first direction using the displacement sensor; and taking a sixth displacement measurement with respect to the second surface in the second direction using the displacement sensor; and wherein step d) further comprises determining the location of the intersection using the first, second, third, fourth, fifth and sixth displacement measurements and the first, second and third identified locations.

19. The method of claim 16 further comprising, after step c):

taking a third displacement measurement with respect to a third surface of the plurality of surfaces in a third direction using the displacement sensor;

positioning the displacement sensor in a second identified location and orientation with respect to the plurality of surfaces;

taking a fourth displacement measurement with respect to the first surface in the first direction using the displacement sensor;

taking a fifth displacement measurement with respect to the second surface in the second direction using the displacement sensor;

taking a sixth displacement measurement with respect to the third surface in the third direction using the displacement sensor;

positioning the displacement sensor in a third identified location and orientation with respect to the plurality of surfaces;

taking a seventh displacement measurement with respect to the first surface in the first direction using the displacement sensor; and taking an eighth displacement measurement with respect to the second surface in the second direction using the displacement sensor;

taking an ninth displacement measurement with respect to the third surface in the third direction using the displacement sensor;

and wherein step d) further comprises determining the location of the intersection using the first, second, third, fourth, fifth, sixth, seventh, eighth and ninth displacement measurements and the first, second and third identified locations.

20. The method of claim 16 wherein step b) further comprises, transmitting a first incident light beam to a point on the first surface and detecting a first reflected light beam, the first reflected light beam comprising a portion of the first incident light beam reflected off of the first surface; and generating the first displacement measurement based on the detected first reflected light beam.

21. The method of claim 20 wherein step c) further comprises, transmitting a second incident light beam to a point on the second surface and detecting a second reflected light beam, the second reflected light beam comprising a portion of the second incident light beam reflected off of the second surface; and generating the second displacement measurement based on the detected second reflected light beam.

* * * * *